(12) United States Patent
Linneberg

(10) Patent No.: US 10,772,270 B2
(45) Date of Patent: Sep. 15, 2020

(54) AEROPONIC COLUMN

(71) Applicant: Aerospring Gardens Pte. Ltd., Singapore (SG)

(72) Inventor: Thorben Linneberg, Singapore (SG)

(73) Assignee: Aerospring Gardens Pte. Ltd., Singapore (SG)

( * ) Notice: Subject to any disclaimer, the term of this patent is extended or adjusted under 35 U.S.C. 154(b) by 275 days.

(21) Appl. No.: 15/764,105

(22) PCT Filed: Sep. 30, 2016

(86) PCT No.: PCT/SG2016/050483
§ 371 (c)(1),
(2) Date: Mar. 28, 2018

(87) PCT Pub. No.: WO2017/058116
PCT Pub. Date: Apr. 6, 2017

(65) Prior Publication Data
US 2018/0263201 A1 Sep. 20, 2018

(30) Foreign Application Priority Data
Sep. 30, 2015 (SG) .............................. 10201508138P

(51) Int. Cl.
*A01G 31/02* (2006.01)
*A01G 9/02* (2018.01)
(52) U.S. Cl.
CPC .............. *A01G 31/02* (2013.01); *A01G 9/022* (2013.01); *Y02P 60/216* (2015.11)

(58) Field of Classification Search
USPC ... 47/62 A, 79, 82, 83, 59 R, 62 R, 63, 65.5, 47/66.1
See application file for complete search history.

(56) References Cited

U.S. PATENT DOCUMENTS

| 5,555,676 | A | * | 9/1996 | Lund | ....................... | A01G 9/022 47/82 |
| 7,516,574 | B2 | * | 4/2009 | Gottlieb | ................. | A01G 9/023 47/62 R |

(Continued)

FOREIGN PATENT DOCUMENTS

JP 01-215224 A 8/1989

OTHER PUBLICATIONS

Jimthecarver, "Aeroponic Strawberry Tower", website http://gardentenders.com/projects/992, posted May 14, 2012.

*Primary Examiner* — Andrea M Valenti
(74) *Attorney, Agent, or Firm* — Porter, Wright, Morris & Arthur, LLP

(57) ABSTRACT

An aeroponic column comprises a base, a planter section attached to the base, wherein the planter section defines a hollow interior, a channel and plant holder openings adapted to receive a plant holder, a nutrient distributor attached over the planter section with fluid openings adapted to allow fluid to flow down the planter sections, and a conduit assembly operatively connected between the base and the nutrient distributor, and adapted to carry fluid from the base to the nutrient distributor. The conduit assembly comprises a conduit formed separate from the planter section, the conduit extends through the channel of the planter section, and the conduit has a male threaded first end and a female threaded second end.

16 Claims, 9 Drawing Sheets

(56) References Cited

U.S. PATENT DOCUMENTS

| | | | | |
|---|---|---|---|---|
| D653,156 S | * | 1/2012 | Phelps | D11/143 |
| 8,250,809 B2 | * | 8/2012 | Simmons | A01G 31/02 47/62 N |
| D792,807 S | * | 7/2017 | Bryan, III | D11/144 |
| 10,531,615 B2 | * | 1/2020 | Jimenez Santillana | A01G 27/06 |
| 2006/0032128 A1 | * | 2/2006 | Bryan, III | A01G 9/022 47/62 R |
| 2009/0000189 A1 | * | 1/2009 | Black | A01G 27/02 47/82 |
| 2009/0090051 A1 | * | 4/2009 | Hogan | A01G 27/003 47/66.6 |
| 2014/0000162 A1 | * | 1/2014 | Blank | A01G 31/06 47/62 A |
| 2016/0135394 A1 | * | 5/2016 | Wagner | A01G 9/022 47/62 R |
| 2017/0055473 A1 | * | 3/2017 | Baker | A01G 31/06 |
| 2017/0105372 A1 | * | 4/2017 | Bryan, III | A01G 31/02 |
| 2017/0258015 A1 | * | 9/2017 | Cudmore | C05F 17/95 |
| 2017/0354096 A1 | * | 12/2017 | Xing | A01G 25/00 |

* cited by examiner

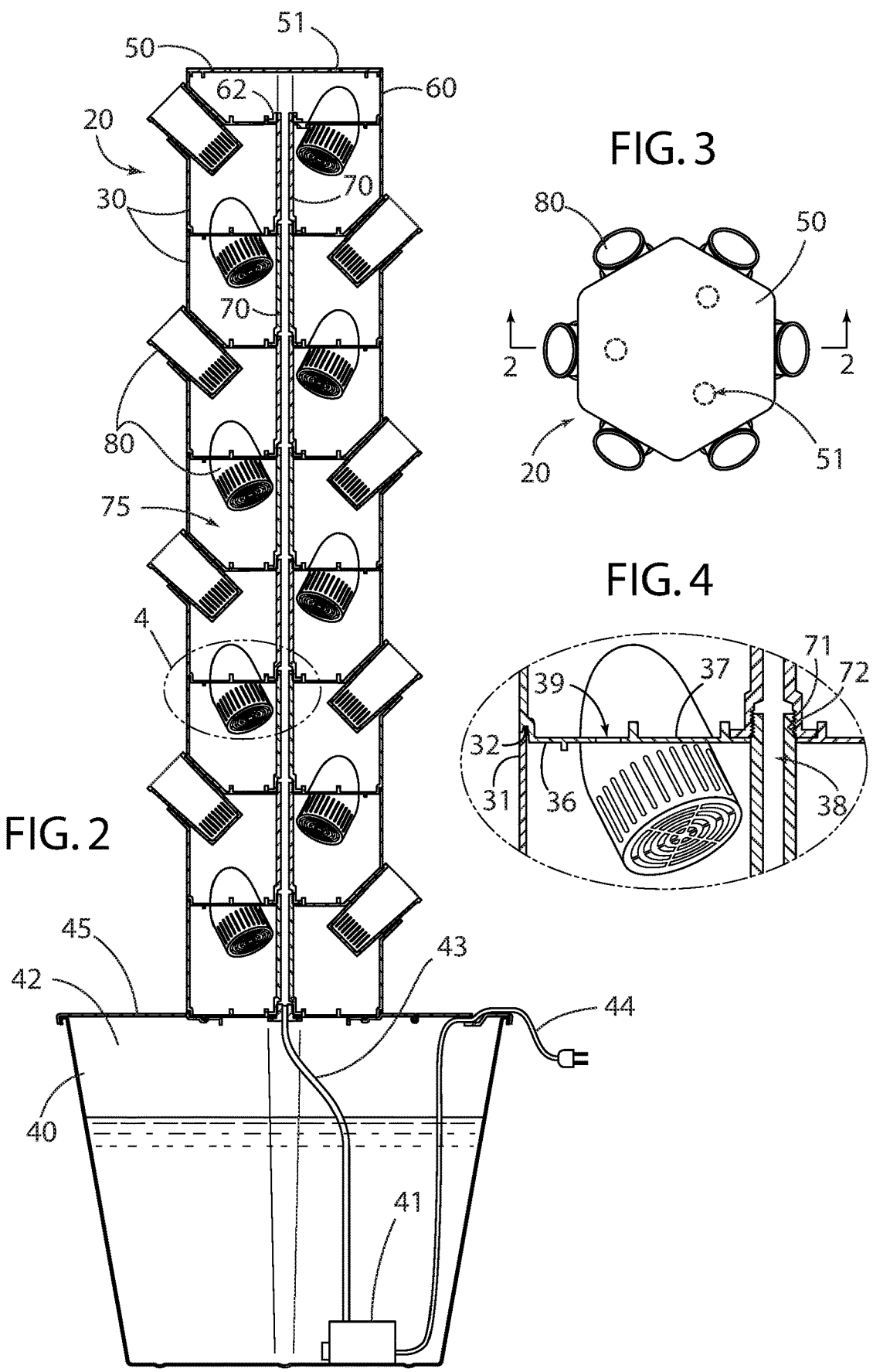

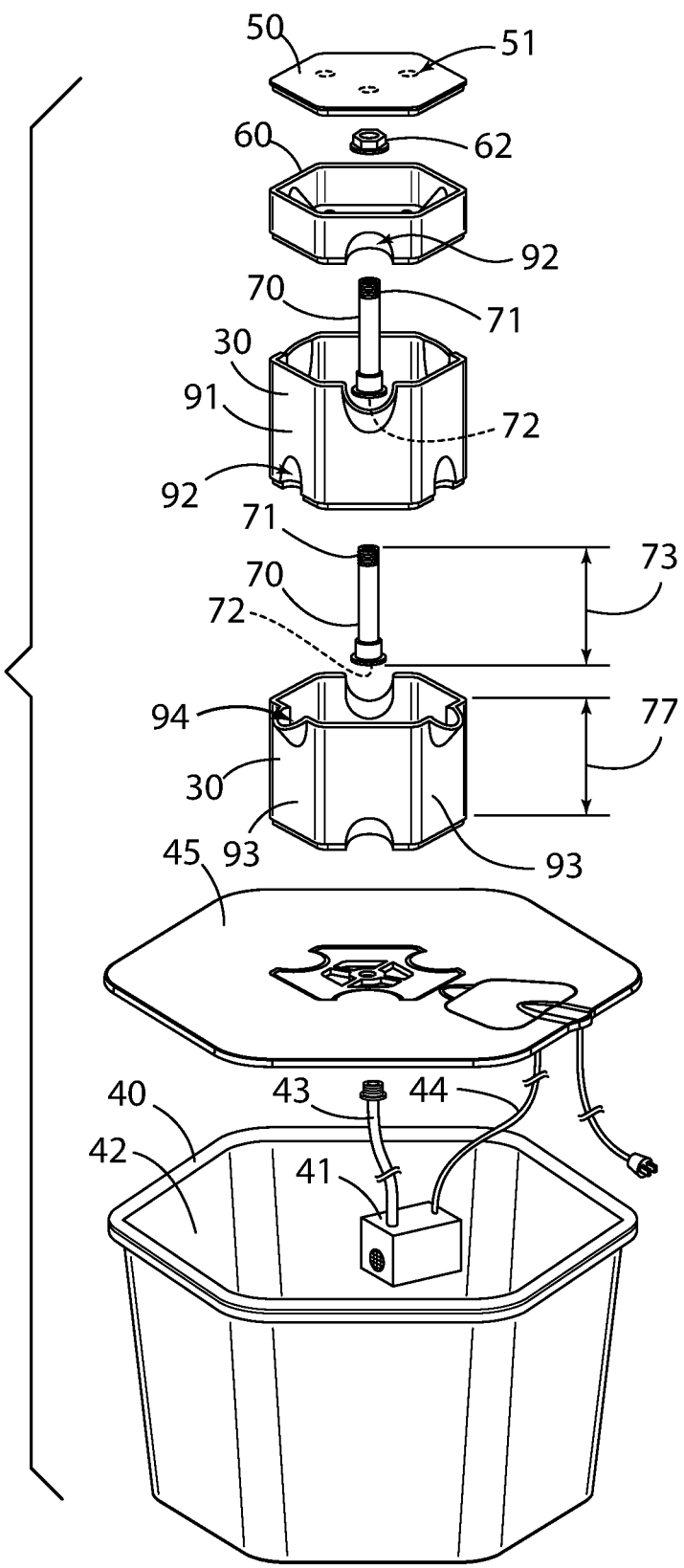

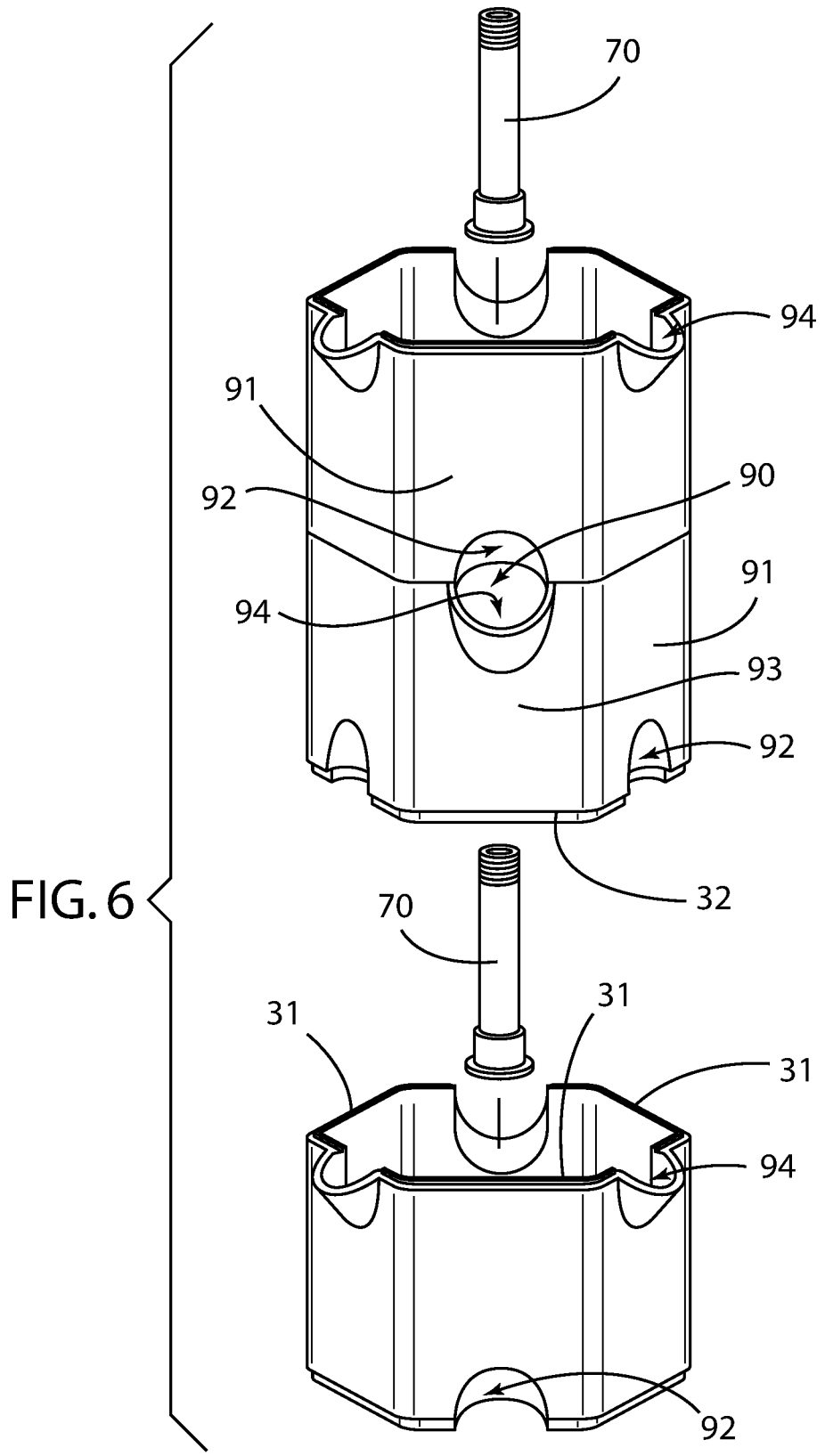

AEROPONIC COLUMN

This patent application claims priority benefit of Singapore patent application 10201508138P, filed on Sep. 30, 2015.

FIELD OF THE INVENTION

This invention relates to aeroponic columns for growing plants, and more particular to improved aeroponic columns of simple, robust construction and modifiability.

BACKGROUND OF THE INVENTION

Aeroponic devices are used for plant cultivation, often in the form of generally vertical columns where horizontal space is limited, as can be the case in an urban environment or a residential setting, for example. Known aeroponic devices have a rotatable modular planting column wherein each module includes a unitary fluid conduit, and the column is mounted in a vertical orientation to circulate a nutrient rich fluid for growing plants in a medium, often a soil-less growth medium. Such vertical columns generally include a lower reservoir for holding nutrient rich fluid to be feed to plants, a planting column for holding the plants, and a watering system running through the column which pumps the fluid upward to the top of the column where it is directed back down to the column interior for watering the plants. See for example U.S. Pat. No. 7,055,282 to Bryan, Ill.

However known aeroponic and hydroponic columns have several problems. They can be relatively difficult to assemble and disassemble, and can have relatively complex structure. Also, known columns may need extra structural reinforcements to hold elements together properly, resist torsional stresses and to reduce the likelihood of leaking, and this makes assembly much more complex. It would be desirable to provide an aeroponic column which is of a simple and strong modular construction, which is easy to assemble and disassemble, and which is aesthetically attractive.

SUMMARY OF THE INVENTION

In accordance with a first aspect, there is provided an aeroponic column comprising a base, a planter section attached to the base, wherein the planter section defines a hollow interior, a channel and plant holder openings adapted to receive a plant holder, a nutrient distributor attached over the planter section with fluid openings adapted to allow fluid to flow down the planter sections, and a conduit assembly operatively connected between the base and the nutrient distributor, and adapted to carry fluid from the base to the nutrient distributor. The conduit assembly comprises a conduit formed separate from the planter section, the conduit extends through the channel of the planter section, and the conduit has a male threaded first end and a female threaded second end.

From the foregoing disclosure and the following more detailed description of various embodiments it will be apparent to those skilled in the art that the present invention provides a significant advance in the technology of aeroponic columns. Particularly significant in this regard is the potential the invention affords for providing a high quality aeroponic column which is of modular construction and is aesthetically attractive. Additional features and advantages of various embodiments will be better understood in view of the detailed description provided below.

BRIEF DESCRIPTION OF THE DRAWINGS

FIG. 2 is a cross section view through the aeroponic column of FIG. 1 taken through line 2-2 in FIG. 3.

FIG. 3 is a top view showing a six-sided column.

FIG. 4 is a close up of the connection between two conduits in a conduit assembly of the aeroponic column of FIG. 1.

FIG. 5 is an exploded isometric view showing some of elements of the aeroponic column of FIG. 1.

FIG. 6 shows tongue and groove nesting of the planter sections.

Figure 1:
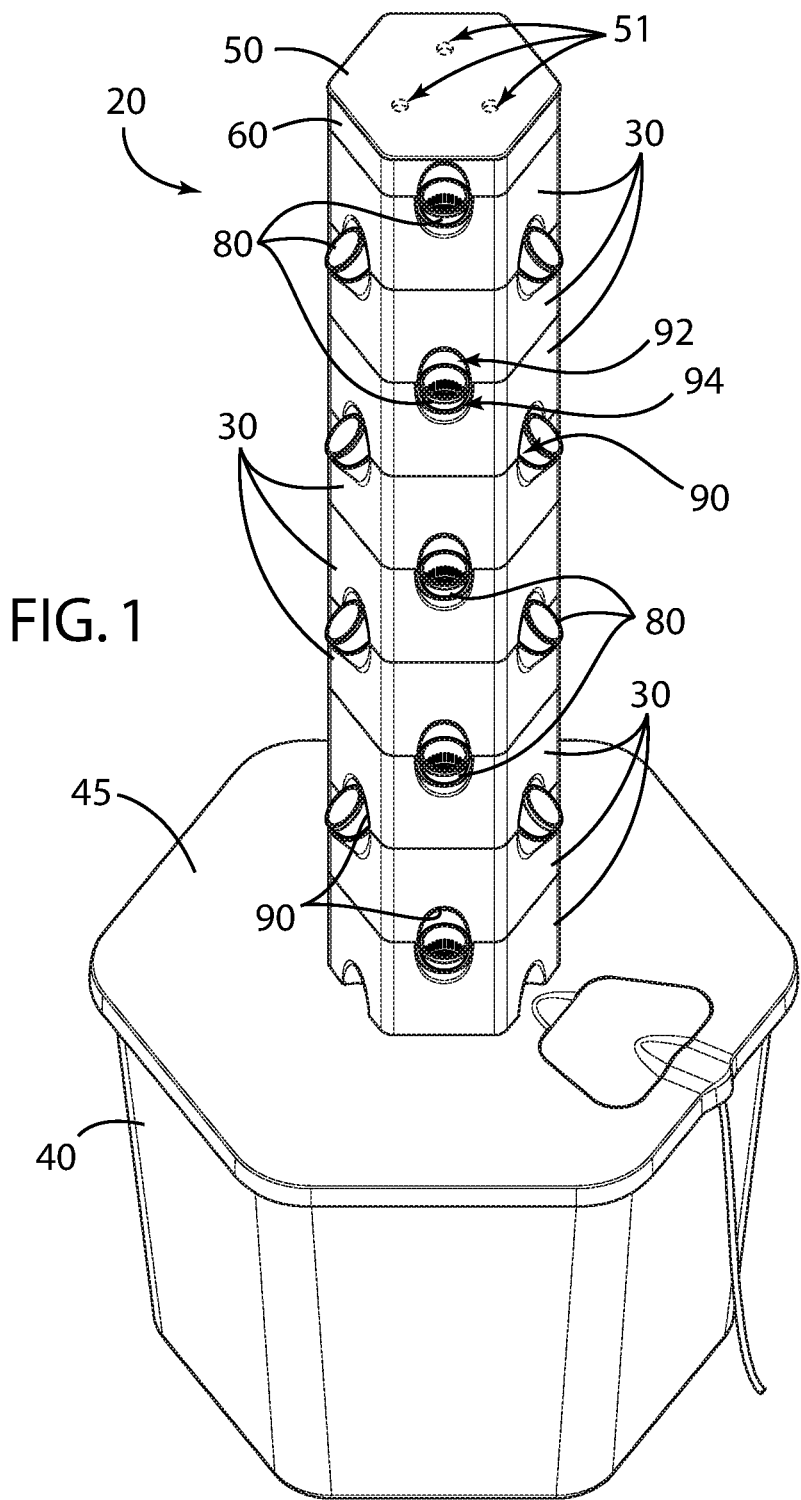
FIG. 1 is an isometric view of an aeroponic column in accordance with one embodiment, showing the column formed with a series of planter sections.

It should be understood that the appended drawings are not necessarily to scale, presenting a somewhat simplified representation of various features illustrative of the basic principles of the invention. The specific design features of the aeroponic column as disclosed here, including, for example, the specific number of planter sections, will be determined in part by the particular intended application and use environment. Certain features of the illustrated embodiments have been enlarged or distorted relative to others to help provide clear understanding. In particular, thin features may be thickened, for example, for clarity of illustration. Also, where two halves combine to form a part, it will be readily understood by those skilled in the art, given the benefit of this disclosure, that each half need not be mathematically precisely equal. All references to direction and position, unless otherwise indicated, refer to the orientation illustrated in the drawings.

DETAILED DESCRIPTION OF CERTAIN EMBODIMENTS

It will be apparent to those skilled in the art, that is, to those who have knowledge or experience in this area of technology, that many uses and design variations are possible for the aeroponic column disclosed here. The following detailed discussion of various alternate features and embodiments will illustrate the general principles of the invention with reference to an aeroponic column for use in a residential setting. Other embodiments suitable for other applications will be apparent to those skilled in the art given the benefit of this disclosure.

Turning now to the drawings, FIG. 1 is an isometric view of an aeroponic column 20 in accordance with an embodiment formed having a base 40 with a lid 45, defining a reservoir for water and other plant nutrients, at least one planter section 30. In the embodiment shown in the drawings, there are nine planter sections stacked sequentially one on top of the other, and each is formed with a polygonal cross section. Preferably the planter sections are all made the same size. Planter sections will have at least three side walls, and can be four, five, six, seven, eight, etc. Here, the planter sections have a hexagonal cross section and are sometimes referred to as hex bodies. The hexagonal cross section also provides stiffness to the column, to help resist dislocation of plant holders 80 (discussed in greater detail below) from the stackable planter sections. The stackable planter sections also allow for ease in disassembly, allowing for rapid movement to a new location, if desired.

A nutrient distributor or shower head 60, and a top or lid 50 is positioned above the planter sections 30. On warm days water can evaporate from the hollow interior, cooling the plants, and warm air may rise up. Optionally the lid may be provided with openings to allow hot air to escape from the hollow interior of the column. Water and nutrients are typically stored in the base. Fluid is pumped up through a conduit assembly from the base through the planter sections to the nutrient distributor, where it is controllably released to rain or drip down through the column, eventually reaching plant holders 80 and thereby watering plants. As discussed in greater detail below, a plant holder opening 90 is provided adapted to releasably receive a corresponding plant holder 80. The upper half 92 of the plant holder opening cooperates with a lower half 94 of the plant holder opening to form the plant holder opening 90. Advantageously many plants can be grown simultaneously on a very small footprint simply by adding more plant holders on the column.

The conduit assembly is show in the cross section view of FIG. 2 taken through the line 2-2 in FIG. 3. Advantageously the conduit assembly is formed separate from the planter sections. Here, the conduit assembly is formed as a series of conduits 70 running through a hollow interior 75 extending through the nutrient distributor 60 and planter sections 30 to operatively connect the nutrient reservoir to the nutrient distributor. That is, the conduits carry fluid, including water and nutrients pumped up from the nutrient reservoir to the nutrient distributor. The top conduit is operatively connected to the nutrient distributor, and may be provided with a valve, screw or other release mechanism such as tightening nut 62 operatively connected to the conduit assembly to allow for control of the amount of nutrients distributed to the plants growing in the column. The bottom conduit is operatively connected to the nutrient reservoir in a manner similar to the connection between conduits positioned in each planter section. The conduits advantageously have a dual function, nutrient transport and securing the column together. Forming the conduit assembly as separate pieces helps avoid problems with trying to do too many things at once with the same elements.

The base 40 can serve as a fluid reservoir 42. A pump 41 can be provided positioned in the base which pumps fluid through a hose 43 to the conduit assembly. The lid 45 may be provided over the fluid reservoir, optionally with a service port as shown. Cord 44 routed out through an opening in the reservoir lid 45 connects the pump to a power source.

In the cross section view of FIG. 2, two of the plant holders 80 are visible at each level, meaning each combination of a pair of adjacent planter sections 30 (or the nutrient distributor 60 and the top planter section) shows two plant holders. In the embodiment shown in the Figs., the plant holders 80, positioned in corresponding plant holder openings, are spaced circumferentially evenly around the conduit assembly and are about 120 degrees apart such that one plant holder is shown in cross section and the other is shown at an angle.

The conduit assembly cooperates with the planter sections to help support the column, advantageously removing the need for separate reinforcing bars to be inserted in the column. The series of conduits 70 may be threadably connected. For example, a first end 71 of a conduit positioned in one planter section is threadably connectable to the second end 72 of an adjacent conduit in another adjacent planter section. Optionally as shown in FIG. 4, for ease of assembly the female threaded end 72 each conduit 70 may be wider than a central channel 38 (which the conduits extend through) at a bottom 36 of the planter section 30, such that the conduit can be balanced or sit on the bottom while an adjacent conduit is threaded together to build out the conduit assembly. FIG. 4 also shows a close up of a tongue 31 and groove 32 connection allowing a pair of adjacent planter sections 30 to releasably and robustly stack together as well as the bottom 36 with a plurality of small openings 39 adapted to allow fluid to pass from planter section to planter section. The tongue and groove design allows for ease of assembly and ease of modification; the overall height of the column may be varied in a straightforward manner by adding or removing a planter section (and corresponding conduit).

FIG. 5 shows an isometric view of a plurality of planter sections positioned between the base and the nutrient distributor, each having a first wall 91 defining an upper plant holder opening 92, and a second wall 93 defining a lower plant holder opening 94. Nutrient distributor 60 is also provided with a wall defining an upper plant holder opening 92. Each conduit 70 can have a length 73 substantially the same as a depth 77 of each planter section 30. (The reduction in length of the column assembly is compensated for by reduction in height of the stacked planter sections due to nesting of the tongue and the groove.) The bottom planter section may be affixed to the lid 45, such as by screwing the parts together, for example. Both the upper plant holder opening 92 and the lower plant holder opening 94 may define semi-cylindrical openings, and combined define a cylindrical plant holder opening 90. As shown the cylindrical opening is angled to allow the plant holder to nest by gravity, but advantageously is still easily removable.

FIG. 6 shows a pair of adjacent planter sections 30 stacked together by insertion of the tongue 31 extending along a top wall of one of the planter section side walls 91 into the groove 32 of an adjacent bottom wall of side wall 93. This assembly technique helps increase the strength of the column, allows for simple stacking and unstacking of stackable bodies to whatever height column is desired, as well as helps prevent water from seeping out of an interior of the stackable bodies. The tongue and groove arrangement can be reversed. The tongue and groove do not extend into the plant holder opening 90. Since at least three walls are provided, instead of a circumferential element, the tongue and groove and side walls 91, 93 cooperate to resist rotation and potential dislocation of the planter sections of the aeroponic column. Each planter section can have an even number of side walls, 91 and 93, and the top of the walls forms alternating first halves of corresponding plant holder openings 90, and the bottom of the walls forms alternating second halves of corresponding plant holder openings 90. The plant holder opening 90 is shown cylindrical and circular in cross section. This cross section, coupled with the use of a corresponding circular cross section plant holder 80 makes for easy insertion and removal of plant holders as desired.

Figure 7:
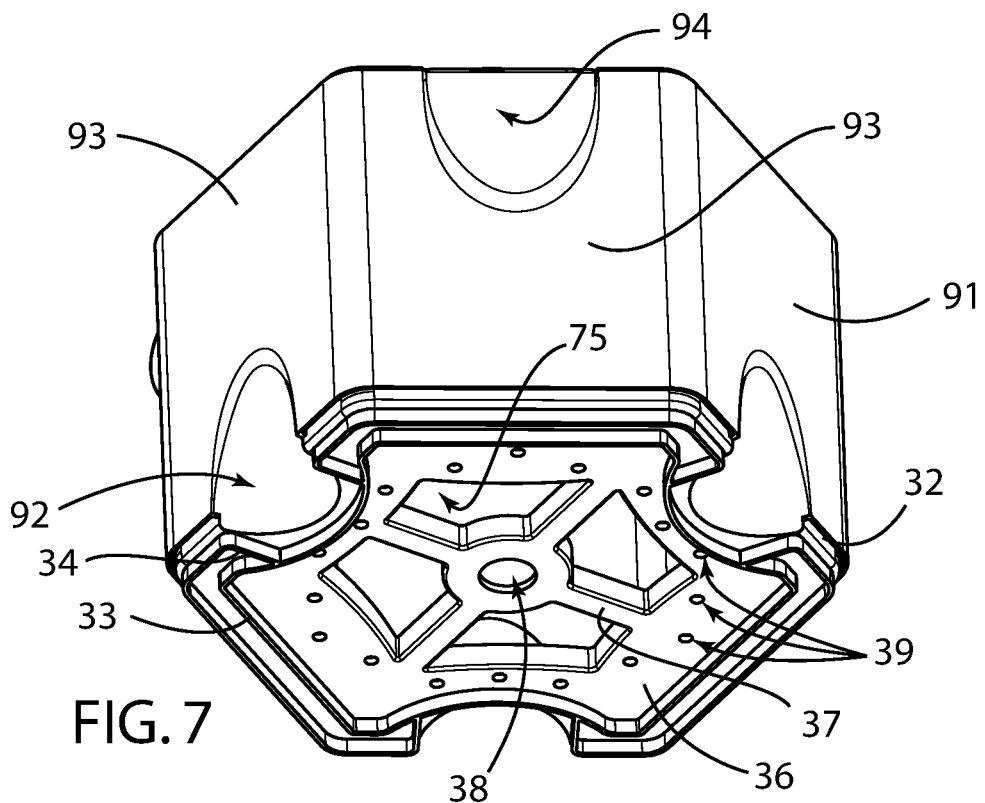
FIG. 7 is an isolated isometric underside view of one of the planter sections of the aeroponic column of FIG. 1.
Figure 8:
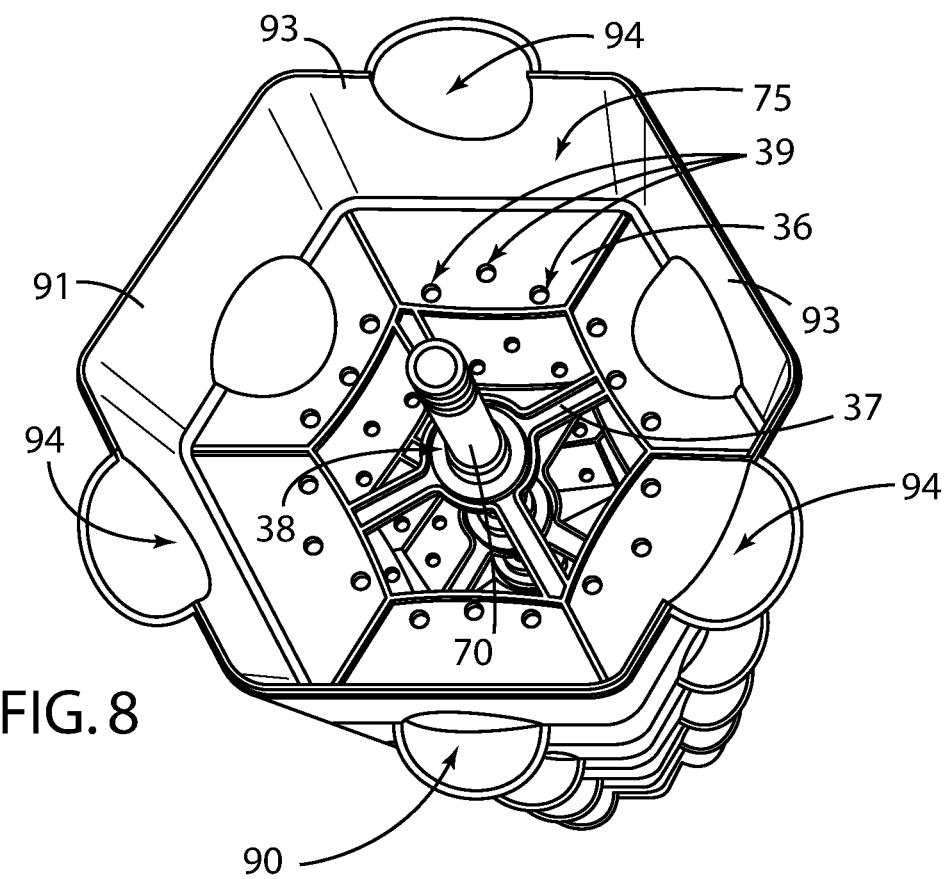
FIG. 8 is a top side isolated isometric view of the aeroponic column of FIG. 1, showing the conduit assembly extending through the planter sections.

FIG. 7 shows an underside of one of the planter sections 30. The tongue 31 is adapted to meet with the groove 32 on an adjacent planter section. In a further effort to help control the flow of water, the planter section is provided with a splash guard 33 and a drip line 34. The drip line helps 33 to keep water from reaching the areas where the planter sections are assembled together. The splash guard 34 helps keep the nutrient solution from splashing and forming large droplets over time on the wrong side of the drip line. Channel 38 is adapted to receive the conduits. Bottom 36 is shown with openings 39 allowing fluid to pass to reach other plants. The flanges meet near the center of the hollow interior 75 and form a ring around the channel 38, helping to fix the location of the conduit assembly. The column needs a way to both carry fluid up to the shower head/ nutrient distributor 60 and be structurally robust enough to withstand loading, including torsional stresses. The strength and rigidity of the column is advantageously enhanced by making the planter sections with a polygonal cross section and stacking them, thereby resisting torsional stresses. As shown in FIGS. 7 and 8, the planter sections 30 also have support flanges 37 which extend from the bottom to the center ring, thereby surrounding the central channel containing the conduits 70, greatly enhancing structural strength. In the embodiment shown here, four flanges 37 are used. The flanges cooperate to define the channel 38 which receives the conduits, thereby reinforcing the conduits all along the length of the column.

Nutrient-containing fluid can flow with gravity from the nutrient distributor 60 down to through the planter sections 30 via openings 39 to allow for access to each plant on each planter section in a relatively uniform manner. The conduits 70 carrying the nutrients are advantageously threaded and are essentially the same length as a depth of each planter section, allowing for modular assembly of aeroponic columns of varying heights, as desired. FIG. 8 also shows how the planter sections can be stacked, with the conduits 70 running through the middle of the hollow interior 75, in channel 38, out of sight, with only the aesthetically attractive show surface of the planter sections 30 (with the plant holders 80 for the plants) visible to the viewer standing adjacent the column.

Figure 9:
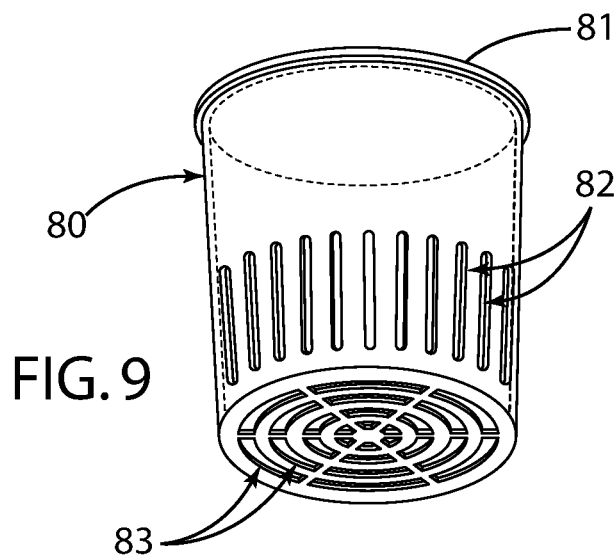
FIG. 9 is an isolated isometric view of a plant holder of the aeroponic column of FIG. 1.

FIG. 9 shows an isolated isometric view of one of the plant holders 80. Rock wool and/or a sponge or foam can be used to hold a seed and be positioned inside the plant holder. Openings 82 on the side and bottom openings 83 can be provided to allow roots to grow and water to enter and exit. Each plant holder opening 90 has a width, and preferably each corresponding plant holder 80 has a bottom width less than the width of the plant holder opening, and a top width greater than the width of the plant holder opening. As shown, the plant holder advantageously has a frusto-conical shape such that it is wider at the top and narrower at the lower end or bottom of the plant holder. Also a lip 81 may be provided to which when inserted into the column rests on one of the planter section, making it much easier to remove the plant holder when a change is desired. The plant holder may have a circular cross section as shown so as to be easily insertable and removable from cylindrical the plant holder openings.

Figure 10:
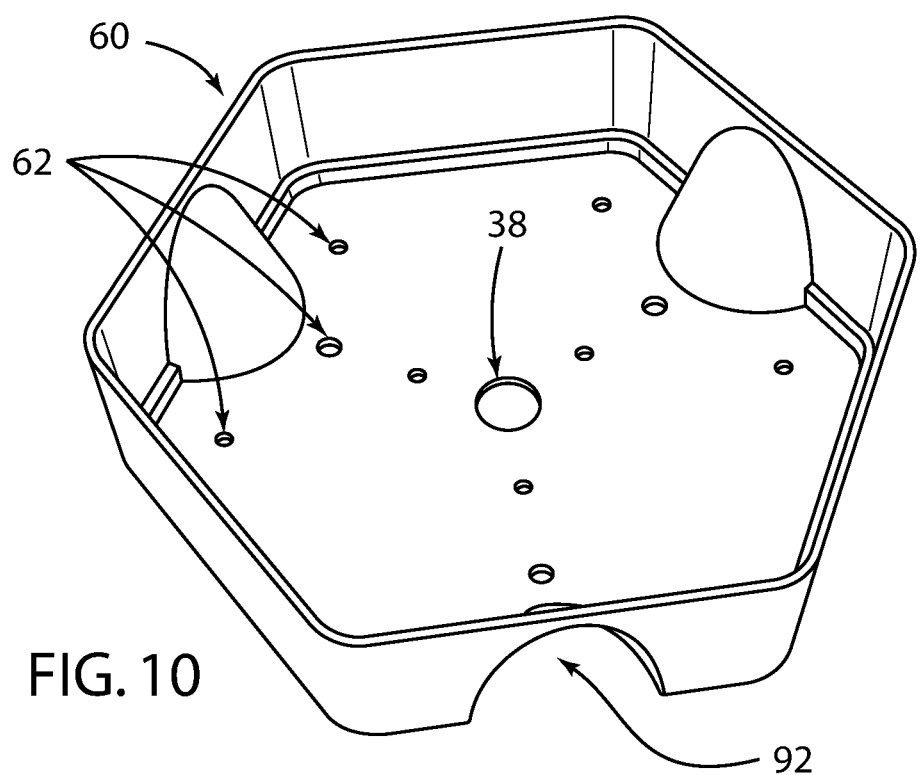
FIG. 10 is an isolated isometric view of the nutrient distributor of the aeroponic column of FIG. 1.

FIG. 10 is an isolated isometric view of the nutrient distributor 60. Structurally the nutrient distributor is similar to the planter sections, in the sense that it has the same polygonal cross section, has plant holder opening upper portion 92 which, when assembled, cooperates with a plant holder opening lower portion 94 of an adjacent planter section to define a plant holder opening. Also, the nutrient distributor may be stacked on top of the planter sections in the same way the planter sections are stacked on top of each other. However, the depth of the nutrient distributor need not be the same, and the geometry of a floor need only provide a central opening 38 for the top conduit, and smaller openings 62 to allow fluid to pass down to the planter sections below.

Figure 11:
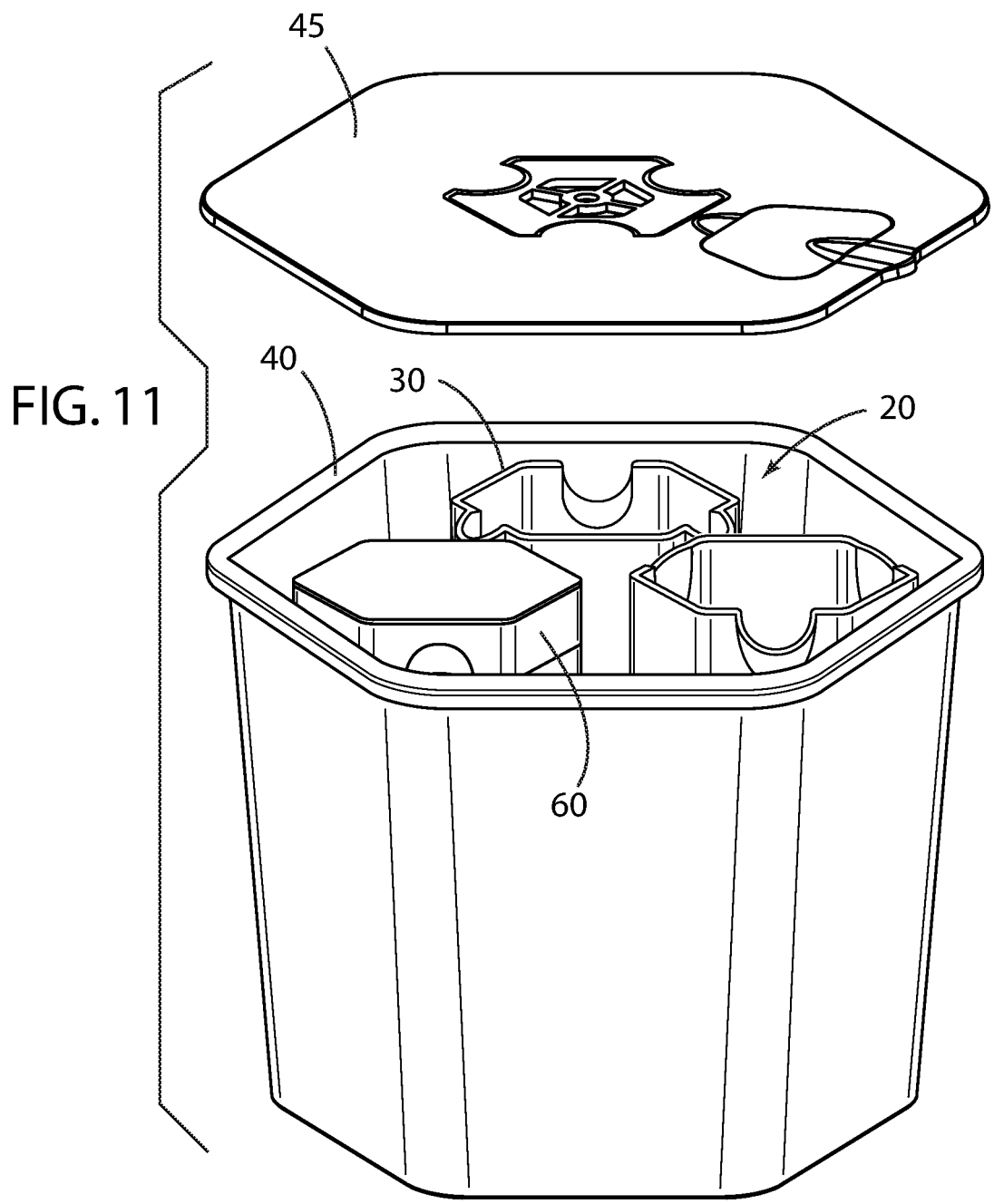
FIG. 11 is an isolated view of the base optionally used for storage of the connector column and nutrient distributor.

FIG. 11 shows how the base 40 can serve as a storage vessel for the nutrient distributor 60 and planter sections/hex bodies 30 when the aeroponic column 20 is not in use. As shown, multiple planter sections/stackable bodies 30 may be stowed in the base and a lid may be placed on the base, helping with disassembly and reassembly at another time and/or location.

Figure 12:
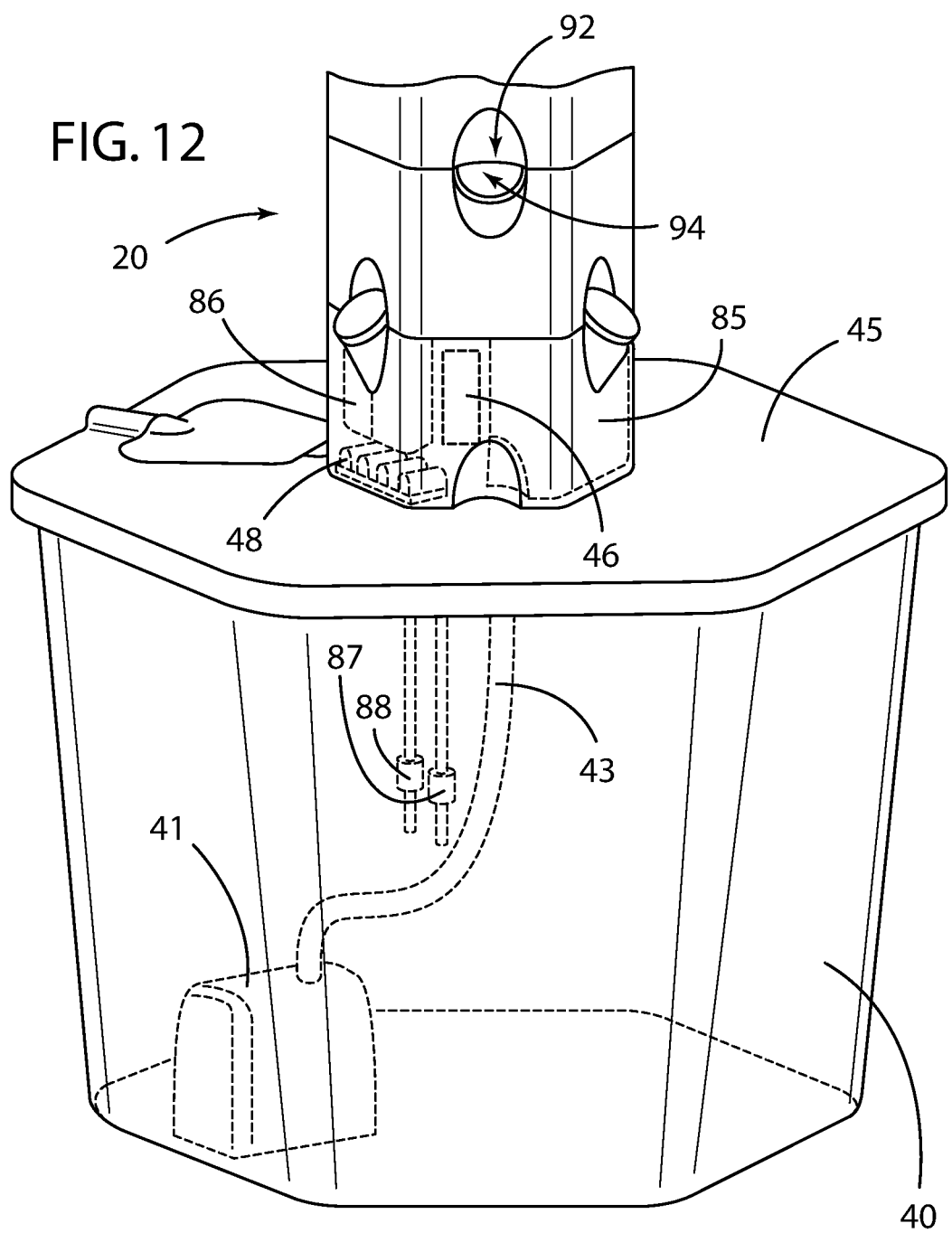
FIGS. 12-13 show views of an optional automatic nutrient controller.
Figure 13:
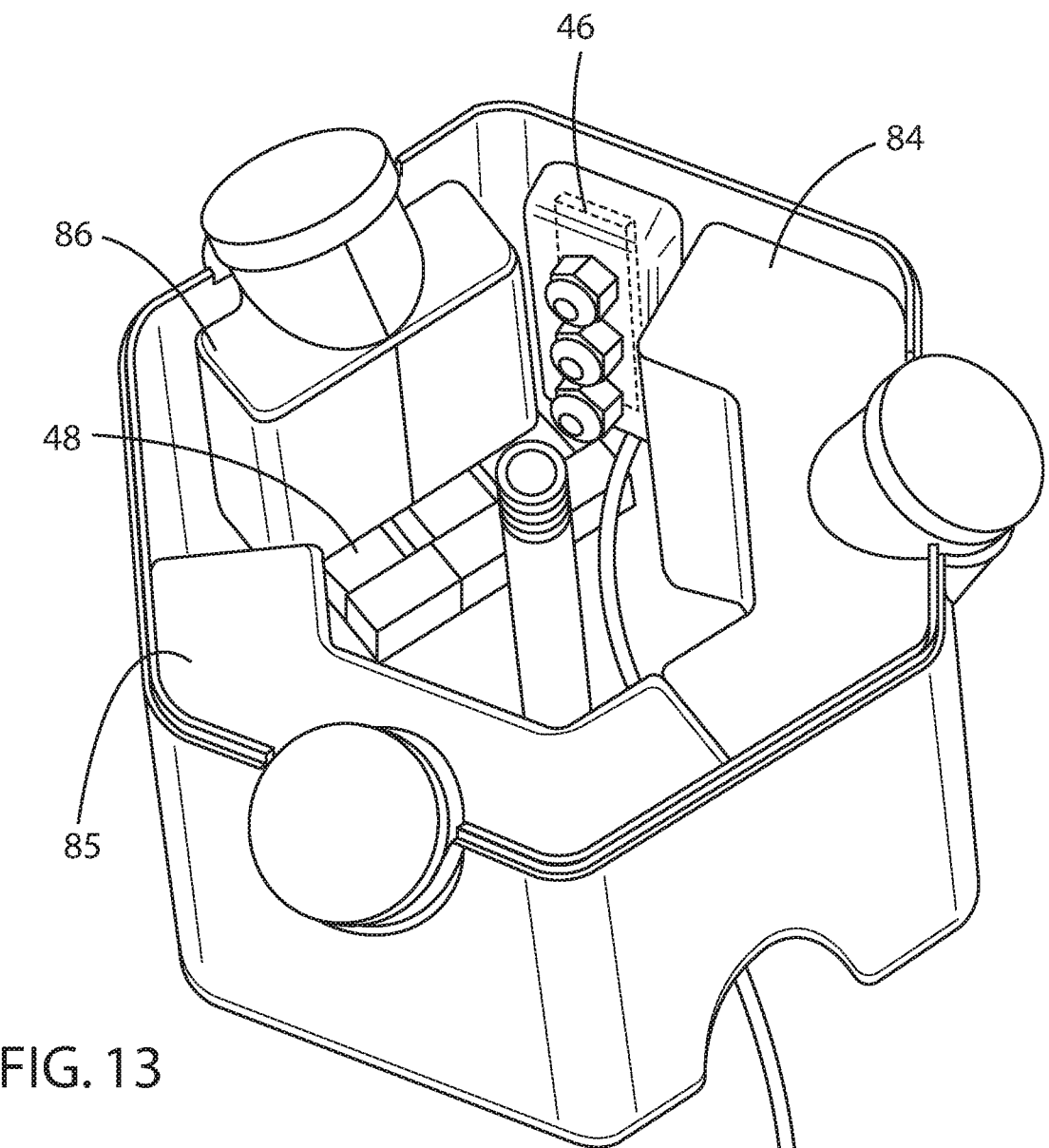

FIGS. 12-13 show an optional automatic nutrient controller 46 operatively connected to a control box 47 and power source which can be added with the pump, attached to the column as a separate module or, as shown here, be positioned inside the lowest planter section immediately adjacent the nutrient reservoir. Also, storage containers for several different types of nutrients can be provided in the lowest planter section. Such storage containers can comprise, for example, pH solutions 86 for making the fluid in the fluid reservoir more acidic or more basic, or mineral solutions 84, 85 for adjusting the amounts of important nutrients in the fluid, depending on the needs of the particular plants to grow. The nutrient reservoir in the base 40 is shown receiving at least one sensor, here with two sensors 87, 88 operatively connected to the controller/logic box 46. One of the sensors 87 can be used to determine pH of the fluid in the reservoir, the other of the sensor 88 can be used to measure mineral levels, for example. Data about the pH and/or mineral levels is sent to the controller 56. If the pH and/or mineral levels of the fluid in the reservoir is not at a desired level, a signal can be sent to a valve assembly 48 to open a valve corresponding to the correct corresponding storage container.

The nutrient controller can be programmed to automatically release nutrients not only in response to data from the sensors, but also at a predetermined rate or at a given time from each storage container and release these nutrients in response to instructions from a user. The logic controller 46 may be operatively connected to a smart phone, pc, laptop etc., for customization of the fluid for particular plants. Also default nutrient release schedules for particular plants may be provided to the user and programmed into the nutrient controller.

From the foregoing disclosure and detailed description of certain embodiments, it will be apparent that various modifications, additions and other alternative embodiments are possible without departing from the true scope of the invention. The embodiments discussed were chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An aeroponic column comprising, in combination:
a base;
a plurality of planter sections each having a bottom and defining a hollow interior, a channel and plant holder openings adapted to receive a plant holder;
a nutrient distributor attached over the planter section with fluid openings, wherein the plantar sections are positioned between the base and the nutrient distributor so as to allow fluid to flow down through the hollow interiors of the planter sections; and
a conduit assembly operatively connected between the base and the nutrient distributor, positioned in the hollow interiors of the planter sections, and adapted to carry fluid from the base to the nutrient distributor;
wherein the conduit assembly comprises a plurality of conduits formed separate from the planter sections, the conduit assembly extends through the channel of the planter sections, and each conduit has a male threaded first end and a female threaded second end;
wherein each of the planter sections has a tongue extending upwardly from an upper edge of each planter section, and the tongue is adapted to engage a corresponding groove on an underside of an adjacent planter section;
a splash guard extends downward from each bottom, wherein each splash guard extends circumferentially around the bottom; and a drip line formed as a downwardly extending projection from the underside of the bottom, and the drip line intersects with the splash guard at the plant holder openings, wherein the drip line cooperates with the splash guard to resist flow of fluid towards the groove.

2. The aeroponic column of claim 1 wherein the first end of one of the conduits positioned in one planter section is threadably connectable to the second end of an adjacent one of the conduits in another adjacent planter section;
the plurality of planter sections each has a first wall defining an upper plant holder portion, and a second wall defining a lower plant holder portion, wherein the upper plant holder portion of one planter section cooperates with the lower plant holder portion of another adjacent planter section to define one of the plant holder openings; and
the lower plant holder portion extends radially away from the hollow interior of the corresponding planter section, and the upper plant holder section extends radially into the hollow interior of the corresponding planter section.

3. The aeroponic column of claim 2 wherein each bottom has openings adapted to allow fluid to pass.

4. The aeroponic column of claim 3 further comprising support flanges extending inwardly from an outward portion of the bottom to a central ring, and the central ring forms a vertically extending channel adapted to receive the conduit, whereby the support flanges and the central ring cooperate to resist relative movement of the planter sections when subjected to torsional stress.

5. The aeroponic column of claim 2 wherein each conduit has a length substantially the same as a depth of each planter section.

6. The aeroponic column of claim 1 wherein the plant holder opening has a circular cross section.

7. The aeroponic column of claim 1 wherein the planter section has a polygonal cross section formed as one of five sided, six sided, seven sided and eight sided.

8. The aeroponic column of claim 1 wherein each channel extends through the corresponding bottom, and the second end of the conduit is wider than the channel at the bottom.

9. The aeroponic column of claim 1 further comprising the plurality of planter sections are positioned between the base and the nutrient distributor, wherein plant holder openings are formed from a pair of adjacent planter portions;
each plant holder opening has a width; and
each corresponding plant holder has a bottom width less than the width of the plant holder opening, and a top width greater than the width of the plant holder opening.

10. The aeroponic column of claim 1 further comprising an automatic nutrient controller operatively connected to at least one sensor adapted to extend into a fluid reservoir in the base, and at least one storage container operatively connected to the automatic nutrient controller, wherein the automatic nutrient controller is adapted to release nutrients in response to data from the at least one sensor.

11. An aeroponic column comprising, in combination:
a base;
a plurality of planter sections stacked vertically, with a lowermost planter section attached to the base, wherein each planter section has side walls, each side wall meets a pair of adjacent side walls such that the side walls circumferentially surround and define a hollow interior, a bottom extending from the side walls into the hollow interior, and plant holder openings formed in the side walls adapted to receive a plant holder;
a nutrient distributor attached over the planter sections with fluid openings adapted to allow fluid to flow down the planter sections through the hollow interiors; and
a conduit assembly operatively connected between the base and the nutrient distributor, and adapted to carry fluid from the base to the nutrient distributor;
wherein the conduit assembly comprises a conduit formed separate from the planter section, the conduit extends through a channel of the planter section, and the conduit has a male threaded first end and a female threaded second end; a central ring which forms a vertically extending channel adapted to receive the conduit; wherein the bottom of each planter section comprises bottom wall sections extending from the side walls and partially toward the center ring; and
support flanges inwardly extending between the bottom wall sections and the central ring, such that the bottom wall sections are remote from the central ring, and the central ring forms a vertically extending channel adapted to receive the conduit, the hollow interior extends between the bottom wall sections, the center ring and the support flanges to allow fluid to flow down the planter sections between the support flanges;
wherein the support flanges cooperate to resist relative movement of the planter sections with respect to the conduit when subjected to torsional stresses.

12. The aeroponic column of claim 11 wherein the support flanges have a U-shaped cross section.

13. The aeroponic column of claim 12 wherein the plant holder opening has a circular cross section.

14. The aeroponic column of claim 11 wherein each of the planter sections has a tongue extending from an upper edge of the walls, and the tongue is adapted to engage a corresponding groove on an underside of an adjacent planter section.

15. The aeroponic column of claim 11 wherein each planter section has an even number of walls, the top of the walls forms alternating first halves of corresponding plant holder openings, and a lower side of the walls forms alternating second halves of corresponding plant holder openings.

16. The aeroponic column of claim 11 wherein the bottom wall sections each define openings allowing fluid to pass between planter sections.

\* \* \* \* \*